US012764586B2

(12) United States Patent
Tao

(10) Patent No.: US 12,764,586 B2
(45) Date of Patent: Oct. 13, 2026

(54) MEASUREMENT METHOD AND APPARATUS, DEVICE, AND READABLE STORAGE MEDIUM

(71) Applicant: Beijing Xiaomi Mobile Software Co., Ltd., Beijing (CN)

(72) Inventor: Xuhua Tao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 220 days.

(21) Appl. No.: 18/721,907

(22) PCT Filed: Dec. 20, 2021

(86) PCT No.: PCT/CN2021/139815
§ 371 (c)(1),
(2) Date: Jun. 20, 2024

(87) PCT Pub. No.: WO2023/115284
PCT Pub. Date: Jun. 29, 2023

(65) Prior Publication Data
US 2025/0063412 A1 Feb. 20, 2025

(51) Int. Cl.
*H04W 24/10* (2009.01)
*H04B 17/345* (2015.01)

(52) U.S. Cl.
CPC .......... *H04W 24/10* (2013.01); *H04B 17/345* (2015.01)

(58) Field of Classification Search
CPC ............................. H04W 24/10; H04B 17/345
(Continued)

(56) References Cited

U.S. PATENT DOCUMENTS 11,792,670 B2 * 10/2023 Jin ........................ H04L 5/0035 370/329
2020/0228213 A1 7/2020 Masal et al.
(Continued)

FOREIGN PATENT DOCUMENTS

CN 109803395 A 5/2019
CN 111052837 A 4/2020
(Continued)

OTHER PUBLICATIONS

LG Electronics, "CLI configuration", 3GPP TSG-RAN WG2 Meeting #111 electronic, R2-2008201, Online, Aug. 17-28, 2020, 19 pages.
(Continued)

*Primary Examiner* — Sibte H Bukhari
(74) *Attorney, Agent, or Firm* — Finnegan, Henderson, Farabow, Garrett & Dunner, L.L.P.

(57) ABSTRACT

A measurement method is performed by a user device, and includes: receiving first configuration information from a network device, wherein the first configuration information indicates to perform a cross-link interference (CLI) measurement for at least one measurement object within at least one downlink bandwidth part (DLBWP) including an inactive DLBWP, and the at least one measurement object includes at least one of SRS-RSRP or CLI-RSSI; performing, based on the first configuration information, the CLI measurement for the at least one measurement object within the at least one DLBWP; and transmitting a measurement report to the network device, wherein the measurement report includes measurement results corresponding to all or some of the at least one DLBWP.

16 Claims, 10 Drawing Sheets

(58) Field of Classification Search
USPC .......................................................... 370/252
See application file for complete search history.

(56) References Cited

U.S. PATENT DOCUMENTS

| | | | |
|---|---|---|---|
| 2020/0351690 | A1 | 11/2020 | Zhu et al. |
| 2021/0144574 | A1 | 5/2021 | Jin et al. |
| 2021/0392530 | A1 | 12/2021 | Shi et al. |
| 2022/0086843 | A1 | 3/2022 | Ying et al. |

FOREIGN PATENT DOCUMENTS

| | | | | | |
|---|---|---|---|---|---|
| CN | 111066354 | A | | 4/2020 | |
| CN | 112188542 | A | | 1/2021 | |
| CN | 120239996 | A | * | 7/2025 | ......... H04B 7/06952 |
| WO | 2020075980 | A1 | | 4/2020 | |
| WO | 2020165210 | A1 | | 8/2020 | |
| WO | WO 2020/167837 | A1 | | 8/2020 | |
| WO | 2021077305 | A1 | | 4/2021 | |
| WO | WO 2021/101285 | A1 | | 5/2021 | |
| WO | 2021114206 | A1 | | 6/2021 | |
| WO | 2021248457 | A1 | | 12/2021 | |

OTHER PUBLICATIONS

Huawei, HiSilicon, "Initial discussion on RRM requirements for CLI measurement", 3GPP TSG-RAN WG4 Meeting #90bis, R4-1903801, XiAn, China, Apr. 8-12, 2019, 5 pages.
International Search Report of International Application No. PCT/CN2021/139815, dated Sep. 21, 2022, 5 pages.
Radio Resource Management for the FDD and TDD modes of New Radio (NR), 3rd Generation Partnership Project, 3GPP TS 38.133 V16.6.0, Release 16, (Dec. 2020), 381 pages.
Radio Resource Management for the FDD and TDD modes of New Radio (NR), 3rd Generation Partnership Project, 3GPP TS 38.133 V17.3.0, Release 17, (Sep. 2021), 480 pages.
Running CR for Introduction of QoE measurements in NR, Ericsson, 3GPP TSG-RAN WG2 Meeting #115-e, R2-2109004, Electronic Meeting, Aug. 9-27, 2021, 1261 pages.
The First Office Action issued by the State Intellectual Property Office of People's Republic of China on Jun. 23, 2025, in corresponding Application No. CN 202180004629.1, 9 pages.
Notice of Allowance for CN Application No. 202180004629.1, dated Apr. 30, 2026.
Office Action for EP Application No. 21 968 438.8, dated May 28, 2026.
ETSI MCC, "Report of 3GPP TSG RAN WG2 meeting #113bis-e", R2-2104701, 3GPP TSG RAN WG2 meeting #113bis-e Online, Apr. 12-20, 2021.

* cited by examiner

MEASUREMENT METHOD AND APPARATUS, DEVICE, AND READABLE STORAGE MEDIUM

CROSS-REFERENCE TO RELATED APPLICATIONS

The present application is a U.S. National Stage of International Application No. PCT/CN2021/139815 filed on Dec. 20, 2021, the entire contents of which are incorporated herein by reference.

TECHNICAL FIELD

The present disclosure relates to the field of wireless communication technology, and more specifically, to a measurement method, device and readable storage medium for switching a down link band width part (DLBWP).

BACKGROUND

In the wireless communication technology such as the 5th Generation Mobile Communication Technology (5G), a cross-link interference (CLI) may occur between user equipments (UEs) when conducting communication simultaneously (including transmitting and/or receiving) on the same time-division duplex (TDD) carrier according to different scheduling commands.

In order to mitigate the cross-link interference, the UE measures the uplink Sounding Reference Signal-Reference Signal Receiving Power (SRS-RSRP) and/or Cross Link Interference-Received Signal Strength Indication (CLI-RSSI).

For example, a group of aggressor UEs transmits data on the same TTD carrier, while another group of victim UEs receives data on this same TTD carrier. The UE measures the SRS-RSRP and/or CLI-RSSI and reports the measurement result, and the network device (e.g., gNB) may evaluate the interference of the aggressor UE to the victim UE based on the measurement result. The aggressor UE transmits an SRS signal with a set configuration, and the victim UE performs an interference measurement on the SRS signal with a corresponding configuration.

SUMMARY

The present disclosure provides a measurement method, device, and readable-storage medium.

A first aspect provides a measurement method performed by a user device, including:

receiving first configuration information from a network device, wherein the first configuration information indicates to perform a cross-link interference (CLI) measurement for at least one measurement object within at least one downlink bandwidth part (DLBWP) including an inactive DLBWP, and the at least one measurement object includes at least one of SRS-RSRP or CLI-RSSI;

performing, based on the first configuration information, the CLI measurement for the at least one measurement object within the at least one DLBWP; and transmitting a measurement report to the network device, wherein the measurement report includes measurement results corresponding to all or some of the at least one DLBWP.

In an implementation, the measurement method further includes:

receiving second configuration information from the network device, wherein the second configuration information indicates a measurement threshold corresponding to the measurement object in the first configuration information, wherein performing, based on the first configuration information, the CLI measurement for the at least one measurement object within the at least one DLBWP includes:

performing, based on the first configuration information and the second configuration information, the CLI measurement for the at least one measurement object within the at least one DLBWP, wherein the first configuration information and the second configuration information are of same configuration information or different configuration information.

In an implementation, the measurement method further includes:

receiving third configuration information from the network device, wherein the third configuration information indicates a measurement interval corresponding to the measurement object in the first configuration information, wherein performing, based on the first configuration information, the CLI measurement for the at least one measurement object within the at least one DLBWP includes:

performing, based on the first configuration information, the second configuration information and the third configuration information, the CLI measurement for the at least one measurement object within the at least one DLBWP, wherein the first configuration information, the second configuration information and the third configuration information are of same configuration information or different configuration information.

In an implementation, the measurement method further includes:

receiving third configuration information from the network device, wherein the third configuration information indicates a measurement interval corresponding to the measurement object in the first configuration information, wherein performing, based on the first configuration information, the CLI measurement for the at least one measurement object within the at least one DLBWP includes:

performing, based on the first configuration information and the third configuration information, the CLI measurement for the at least one measurement object within the at least one DLBWP, wherein the first configuration information and the third configuration information are of same configuration information or different configuration information.

In an implementation, an interference value of each DLBWP corresponding to a measurement result included in the measurement report is greater than or equal to a corresponding measurement threshold.

In an implementation, an interference value of each DLBWP corresponding to a measurement result included in the measurement report is less than or equal to a corresponding measurement threshold.

In an implementation, the measurement method further includes:

receiving a switching indication from the network device, wherein the switching indication indicates a target DLBWP to be switched to, and the target DLBWP is a DLBWP determined by the network device based on the measurement report.

A second aspect provides a measurement method performed by a network device, including:

transmitting first configuration information to a user device, wherein the first configuration information indicates to perform a cross-link interference (CLI) measurement for at least one measurement object within at least one downlink bandwidth part (DLBWP), and the at least one measurement object includes at least one of SRS-RSRP or CLI-RSSI;

receiving a measurement report transmitted by the user device, wherein the measurement report includes measurement results corresponding to all or some of the at least one DLBWP.

In an implementation, the measurement method further includes:

transmitting second configuration information to the user device, wherein the second configuration information indicates a measurement threshold corresponding to the measurement object in the first configuration information, wherein the first configuration information and the second configuration information are of same configuration information or different configuration information.

In an implementation, the measurement method further includes:

transmitting third configuration information to the user device, wherein the third configuration information indicates a measurement interval corresponding to the measurement object in the first configuration information, wherein the first configuration information, the second configuration information and the third configuration information are of the same configuration information or different configuration information.

In an implementation, the measurement method further includes:

transmitting third configuration information to the user device, wherein the third configuration information indicates a measurement interval corresponding to the measurement object in the first configuration information, wherein the first configuration information and the third configuration information are of same configuration information or different configuration information.

In an implementation, the measurement method further includes:

determining a target DLBWP based on the measurement report; and transmitting a switching indication to the user device, wherein the switching indication instructs the user device to switch to the target DLBWP.

In an implementation, an interference value of each DLBWP corresponding to the measurement result included in the measurement report is greater than or equal to a corresponding measurement threshold, and determining the target DLBWP based on the measurement report includes:

determining the target DLBWP to be any one of the at least one DLBWP other than a DLBWP included in the measurement report.

In an implementation, an interference value of each DLBWP corresponding to the measurement result included in the measurement report is less than or equal to a corresponding measurement threshold, and determining the target DLBWP based on the measurement report includes:

determining the target DLBWP to be any one of DLBWPs included in the measurement report.

In an implementation, determining the target DLBWP to be any one of the DLBWPs corresponding to the measurement result included in the measurement report includes:

determining the target DLBWP to be a DLBWP, with the smallest interference value, of the DLBWPs included in the measurement report.

A third aspect provides a communication device. The communication device may execute the step which is executed by the network device in the first aspect. The network device may implement each function in the above method via a hardware structure or a software module, or in a form of hardware structure plus software module.

When the communication device in the third aspect is implemented via the software module, the communication device includes a transceiver module and a processing module.

The transceiver module is configured to receive first configuration information from a network device, wherein the first configuration information indicates to perform a cross-link interference (CLI) measurement for at least one measurement object within at least one downlink bandwidth part (DLBWP), and the at least one measurement object includes at least one of SRS-RSRP or CLI-RSSI.

The processing module is configured to perform, based on the first configuration information, the CLI measurement for the at least one measurement object within the at least one DLBWP.

The transceiver module is further configured to transmit a measurement report to the network device, and the measurement report includes measurement results corresponding to all or some of the at least one DLBWP.

In an implementation, the transceiver module is further configured to receive second configuration information from the network device, and the second configuration information indicates a measurement threshold corresponding to the measurement object in the first configuration information, and the processing module is further configured to perform, based on the first configuration information and the second configuration information, the CLI measurement for the at least one measurement object within the at least one DLBWP, wherein the first configuration information and the second configuration information are of same configuration information or different configuration information.

In an implementation, the transceiver module is further configured to receive third configuration information from the network device, and the third configuration information indicates a measurement interval corresponding to the measurement object in the first configuration information, and the processing module is further configured to perform, based on the first configuration information, the second configuration information and the third configuration information, the CLI measurement for the at least one measurement object within the at least one DLBWP, wherein the first configuration information, the second configuration information and the third configuration information are of same configuration information or different configuration information.

In an implementation, the transceiver module is further configured to receive third configuration information from the network device, and the third configuration information indicates a measurement interval corresponding to the measurement object in the first configuration information, and the processing module is further configured to perform, based on the first configuration information and the third configuration information, the CLI measurement for the at least one measurement object within the at least one DLBWP, wherein the first configuration information and the third configuration information are of same configuration information or different configuration information.

In an implementation, the transceiver module is further configured to receive a switching indication from the network device, the switching indication indicates a target DLBWP to be switched to, and the target DLBWP is a DLBWP determined by the network device based on the measurement report.

A fourth aspect provides a communication device. The communication device may execute the step which is executed by the network device in the second aspect. The network device may implement each function in the above method via a hardware structure or a software module, or in a form of hardware structure plus software module.

When the communication device in the fourth aspect is implemented via the software module, the communication device includes a transceiver module and a processing module.

The transceiver module is configured to: transmit first configuration information to a user device, wherein the first configuration information indicates to perform a cross-link interference (CLI) measurement for at least one measurement object within at least one downlink bandwidth part (DLBWP), and the at least one measurement object includes at least one of SRS-RSRP or CLI-RSSI, and receive a measurement report transmitted by the user device, wherein the measurement report includes measurement results corresponding to all or some of the at least one DLBWP.

The processing module is configured to determine a target DLBWP based on the measurement report.

The transceiver module is further configured to transmit a switching indication to the user device, and the switching indication instructs the user device to switch to the target DLBWP.

The transceiver module is further configured to transmit second configuration information to the user device, wherein the second configuration information indicates a measurement threshold corresponding to the measurement object in the first configuration information, and wherein the first configuration information and the second configuration information are of same configuration information or different configuration information.

In an implementation, the transceiver module is further configured to transmit third configuration information to the user device, wherein the third configuration information indicates a measurement interval corresponding to the measurement object in the first configuration information, and wherein the first configuration information, the second configuration information and the third configuration information are of the same configuration information or different configuration information.

In an implementation, the transceiver module is further configured to transmit third configuration information to the user device, wherein the third configuration information indicates a measurement interval corresponding to the measurement object in the first configuration information, and wherein the first configuration information and the third configuration information are of same configuration information or different configuration information.

In an implementation, the processing module is further configured to determine a target DLBWP based on the measurement report; and the transceiver module is further configured to transmit a switching indication to the user device, wherein the switching indication instructs the user device to switch to the target DLBWP.

In an implementation, the processing module is further configured to determine the target DLBWP to be any one of the at least one DLBWP other than a DLBWP included in the measurement report when an interference value of each DLBWP corresponding to the measurement result included in the measurement report is greater than or equal to a corresponding measurement threshold.

In an implementation, the processing module is further configured to determine the target DLBWP to be any one of DLBWPs included in the measurement report when an interference value of each DLBWP corresponding to the measurement result included in the measurement report is less than or equal to a corresponding measurement threshold.

A fifth aspect provides a computer-readable storage medium having instructions (or a computer program or a program) stored thereon which, when being called and executed by a computer, cause the computer to perform the first aspect.

A sixth aspect provides a computer-readable storage medium having instructions (or a computer program or a program) stored thereon which, when being called and executed by a computer, cause the computer to perform the second aspect.

It is to be understood that the above general description and the following detailed descriptions are exemplary and explanatory only and do not limit the present disclosure.

BRIEF DESCRIPTION OF THE DRAWINGS

The accompanying drawings illustrated herein are used to provide a further understanding of the embodiments of the present disclosure and form part of the present application, and the schematic embodiments of the present disclosure and their illustrations are used to explain the embodiments of the present disclosure and do not constitute an undue limitation on the embodiments of the present disclosure.

The accompanying drawings herein, which are incorporated into and form a part of the specification, illustrate embodiments consistent with the embodiments of the present disclosure and are used, along with the specification, to explain the principles of the embodiments of the present disclosure.

DETAILED DESCRIPTION

Figure 1:
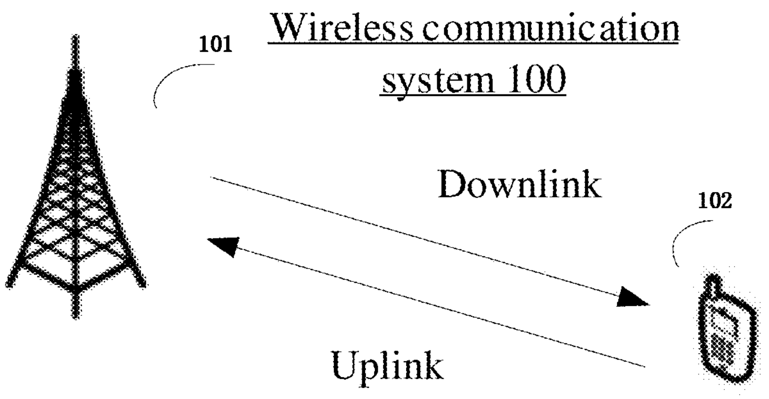
FIG. 1 is a schematic diagram of a wireless communication system architecture according an embodiment of the present disclosure.

Embodiments of the present disclosure are further described in conjunction with the accompanying drawings and specific embodiments.

Embodiments will be described herein in detail, examples of which are represented in the accompanying drawings. When the following description relates to the accompanying drawings, the same reference numerals in different accompanying drawings indicate the same or similar elements unless otherwise indicated. The implementations described in the following embodiments do not represent all implementations consistent with the embodiments of the present disclosure. Rather, they are only examples of devices and methods consistent with some aspects of the present disclosure as detailed in the appended claims.

As shown in FIG. 1, a measurement method according to an embodiment of the present disclosure may be applied to a wireless communication system 100, which may include, but is not limited to, a network device 101 and a user device 102. The user device 102 is configured to support carrier aggregation, and the user device 102 may be coupled to a plurality of carrier units (including a primary carrier unit and one or more secondary carrier units) of the network device 101.

It should be understood that the above wireless communication system 100 may be applicable to both low frequency and high frequency scenarios. The application scenarios of the wireless communication system 100 include, but are not limited to, a long term evolution (LTE) system, an LTE frequency division duplex (FDD) system, an LTE time division duplex (TDD) system, a worldwide interoperability for micro wave access (WiMAX) communication system, a cloud radio access network (CRAN) system, a future 5th-generation (5G) system, a new radio (NR) communication system, a future evolved public land mobile network (PLMN) system, and the like.

The user device 102 shown above may be a user equipment (UE), a terminal, an access terminal, a terminal unit, a terminal station, a mobile station (MS), a remote station, a remote terminal, a mobile terminal, a wireless communication device, a terminal agent, or a user apparatus. The user device 102 may have a wireless transceiver function, which can communicate (e.g., wirelessly) with one or more network devices 101 of the one or more communication systems, and accept network services provided by the network device 101. The network device 101 herein includes, but is not limited to, the base station illustrated.

The user device 102 may be a cellular telephone, a cordless telephone, a session initiation protocol (SIP) telephone, a wireless local loop (WLL) station, a personal digital assistant (PDA) device, a handheld device with wireless communication capabilities, a computing device or other processing device connected to a wireless modem, an in-vehicle device, a wearable device, a user device in a future 5G network, or a user device in a future evolved PLMN network, and the like.

The network device 101 may be an access network device (or access network site). The access network device is a device that has a function of providing network access, such as a radio access network (RAN) base station and the like. The network device may specifically include a base station (BS) device, or include a base station device and a wireless resource management device for controlling the base station device, and the like. The network device may also include a relay station (a relay device), an access point, and a base station in the future 5G network, a base station in the future evolved PLMN network, or a NR base station, and the like. The network device may be a wearable device or an in-vehicle device. The network device may also be a communication chip having a communication module.

For example, the network device 101 includes, but is not limited to, a next-generation base station (gnodeB, gNB) in 5G, an evolved node B (eNB) in an LTE system, a radio network controller (RNC), a node B (NB) in a WCDMA system, a wireless controller in a CRAN system, a base station controller (BSC), a base transceiver station (BTS) in a GSM system or a CDMA system, a home base station (e.g., a home evolved nodeB, or a home node B, HNB), a baseband unit (BBU), a transmitting and receiving point (TRP), a transmitting point (TP), or a mobile switching center and the like.

In view of the fact that the UE only performs the CLI measurement on an active BWP but not on other downlink BWPs in the service cell, which cannot ensure the accuracy of the measurement result, it may consider how to improve the accuracy of the measurement result. Further, how to switch to a suitable DLBWP in case of cross-link interference is a technical problem to be solved.

Figure 2:
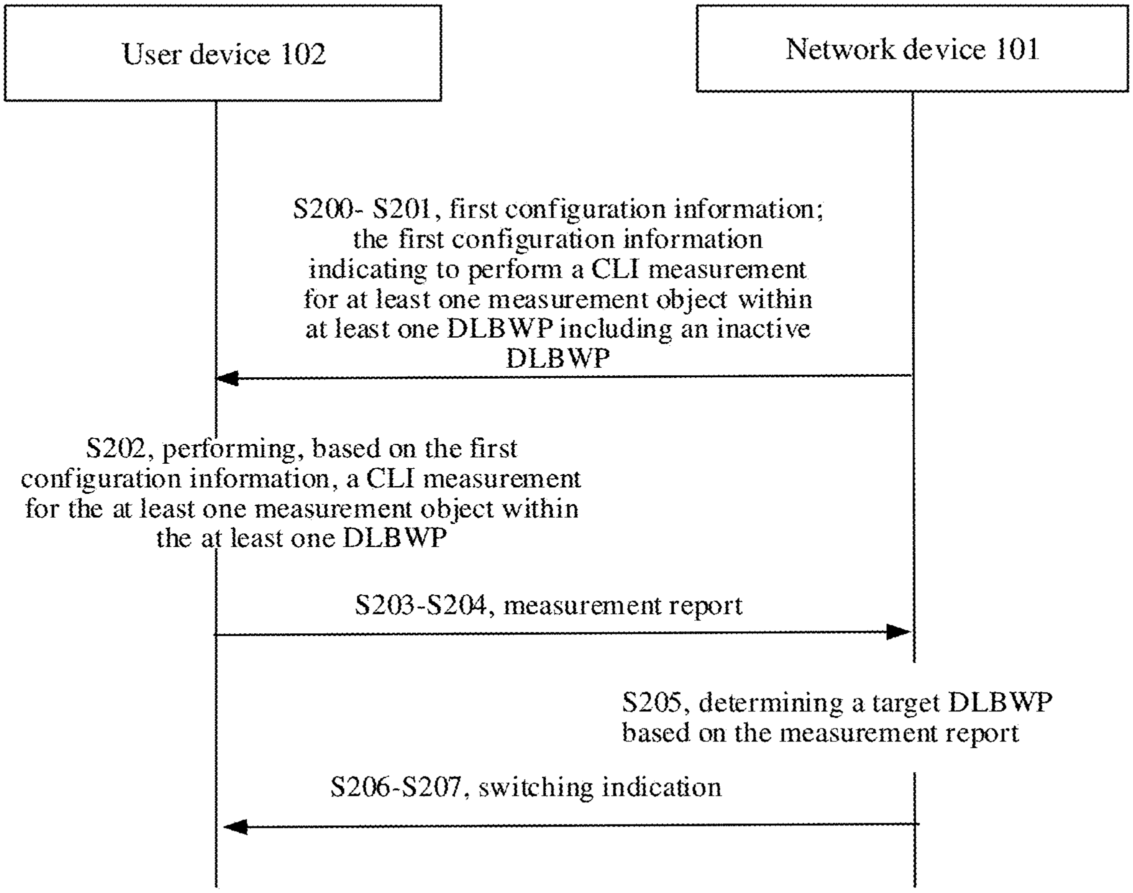
FIG. 2 is a flowchart of a measurement method according to an embodiment.

An embodiment of the present disclosure provides a measurement method. FIG. 2 is a flowchart of a measurement method according to an embodiment. As shown in FIG. 2, the measurement method includes the following steps.

In step S200, the network device 101 transmits first configuration information to the user device 102. The first configuration information indicates to perform a cross-link interference (CLI) measurement for at least one measurement object within at least one DLBWP, and the at least one measurement object includes at least one of SRS-RSRP or CLI-RSSI.

In some implementations, the at least one DLBWP includes at least one inactive BWP.

In some implementations, only one active BWP is included in the same service cell, and thus the at least one DLBWP includes at least one inactive DLBWP.

In step S201, the user device 102 receives the first configuration information from the network device 101.

In step S202, the user device 102 performs, based on the first configuration information, a CLI measurement for the at least one measurement object within the at least one DLBWP.

In step S203, the user device 102 transmits a measurement report to the network device 101. The measurement report includes measurement results corresponding to all or some of DLBWPs of the at least one DLBWP.

In step S204, the network device 101 receives the measurement report transmitted by the user device 101.

In step S205, the network device 101 determines a target DLBWP based on the measurement report.

In step S206, the network device 101 transmits a switching indication to the user device 102. The switching indication instructs the user device 102 to switch to the target DLBWP.

In step S207, the user device 102 receives the switching indication.

The user device 102 may switche to the target DLBWP.

In the embodiment of the present disclosure, the deficiency that the user device can only perform the CLI measurement on one active BWP in the same service cell is overcome by performing a measurement on at least one DLBWP including an inactive DLBWP in the same service cell, thereby obtaining more accurate measurement results.

Figure 3:
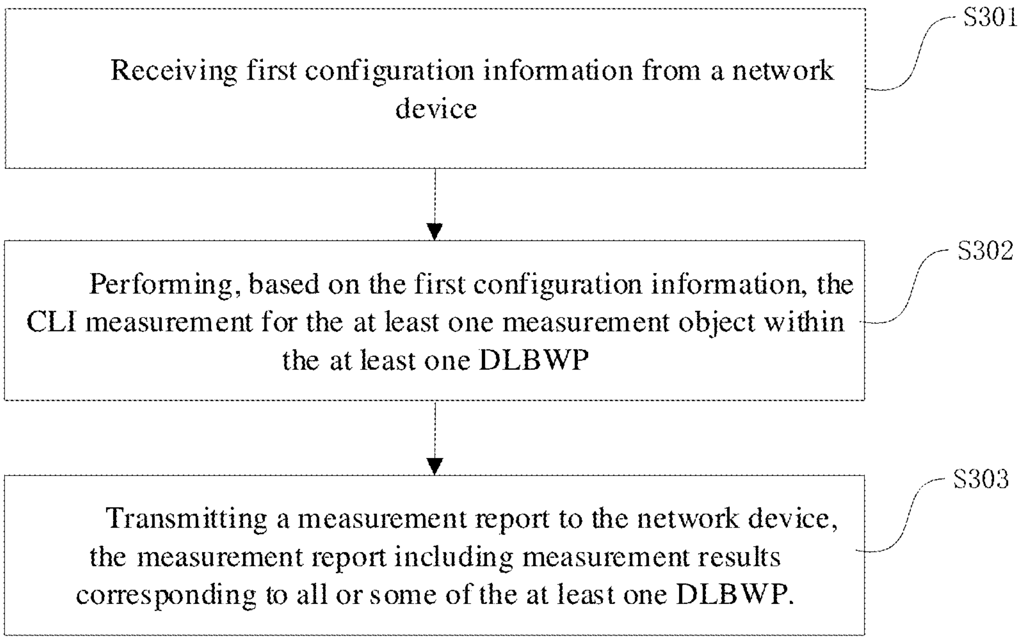
FIG. 3 is a flowchart of another measurement method according to an embodiment.

An embodiment of the present disclosure provides a measurement method, which is performed by a user device. FIG. 3 is a flowchart of a measurement method according to an embodiment. As shown in FIG. 3, the measurement method includes:

step S301, receiving first configuration information from a network device, wherein the first configuration information indicates to perform a cross-link interference (CLI) measurement for at least one measurement object within at least one downlink bandwidth part (DLBWP), and the at least one measurement object includes at least one of SRS-RSRP or CLI-RSSI;

step S302, performing, based on the first configuration information, the CLI measurement for the at least one measurement object within the at least one DLBWP; and step S303, transmitting a measurement report to the network device, wherein the measurement report includes measurement results corresponding to all or some of the at least one DLBWP.

In some implementations, the at least one DLBWP includes at least one inactive BWP.

In some implementations, only one active BWP is included in the same service cell, and thus the at least one DLBWP includes at least one inactive DLBWP.

In some implementations, receiving the first configuration information from the network device includes receiving RRC signaling, and the RRC signaling includes the first configuration information.

In some implementations, the measurement report includes a measurement result for each of the at least one DLBWP.

In some implementations, a switching indication is also received from the network device. The switching indication indicates a target DLBWP to be switched to. The target DLBWP is a DLBWP determined by the network device based on the measurement report. In some implementations, after receiving the switching indication from the network device, the user device switches to the target DLBWP indicated by the switching indication.

In the embodiment of the present disclosure, the deficiency that the user device can only perform the CLI measurement on one active BWP in the same service cell is overcome by performing a measurement on at least one DLBWP including an inactive DLBWP in the same service cell, thereby obtaining more accurate measurement results.

An embodiment of the present disclosure provides a measurement method, which is performed by a user device. The measurement method includes:

receiving first configuration information from a network device, wherein the first configuration information indicates to perform a cross-link interference (CLI) measurement for at least one measurement object within at least one downlink bandwidth part (DLBWP), and the at least one measurement object includes at least one of SRS-RSRP or CLI-RSSI;

performing, based on the first configuration information, the CLI measurement for the at least one measurement object within the at least one DLBWP;

transmitting a measurement report to the network device, wherein the measurement report includes a measurement result corresponding to each of the at least one DLBWP;

receiving a switching indication from the network device, wherein the switching indication indicates a target DLBWP to be switched to, and the target DLBWP is a DLBWP corresponding to the measurement result with the smallest interference value determined by the network device according to the measurement results of all DLBWPs in the measurement report.

In some embodiments, after receiving the switching indication from the network device, the user device switches to the target DLBWP indicated by the switching indication.

In the embodiment of the present disclosure, the user device transmits the measurement report to the network device, the measurement report includes the measurement result corresponding to each DLBWP in the at least one DLBWP, so that the network device selects the target DLBWP in the case of knowing the measurement result corresponding to each DLBWP.

Figure 4:
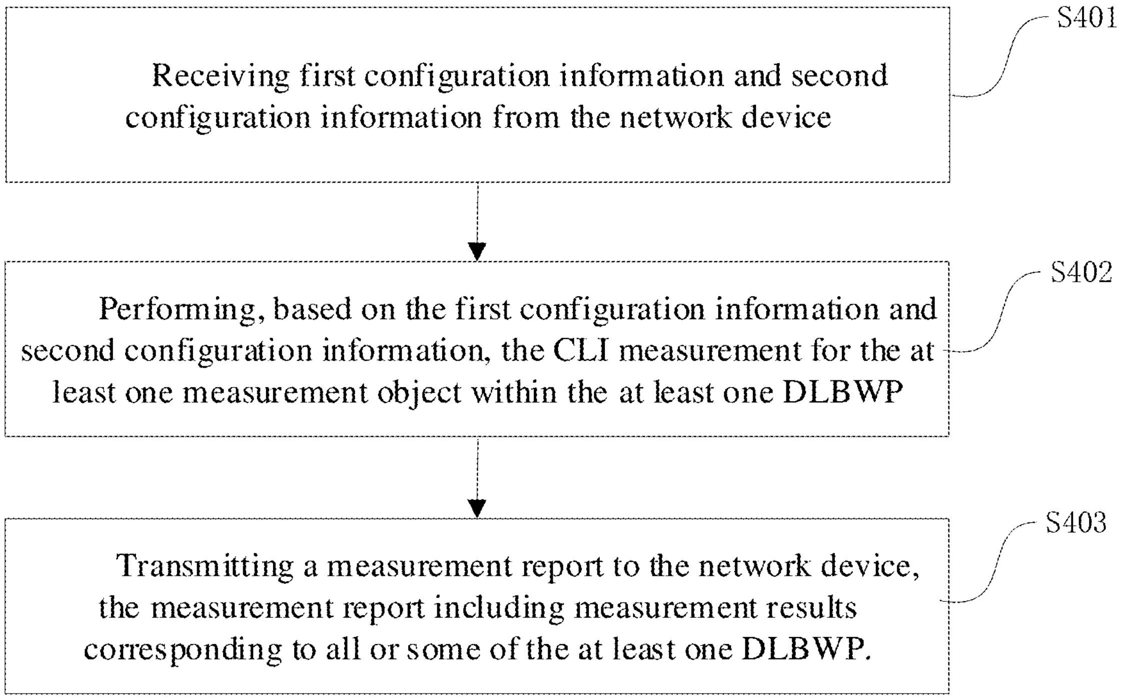
FIG. 4 is a flowchart of another measurement method according to an embodiment.

An embodiment of the present disclosure provides a measurement method, which is performed by a user device. FIG. 4 is a flowchart of a measurement method according to an embodiment. As shown in FIG. 4, the measurement method includes:

step S401, receiving first configuration information and second configuration information from the network device, wherein the first configuration information indicates to perform a cross-link interference (CLI) measurement for at least one measurement object within at least one downlink bandwidth part (DLBWP), the at least one measurement object includes at least one of SRS-RSRP or CLI-RSSI, and the second configuration information indicates a measurement threshold corresponding to the measurement object in the first configuration information;

step S402, performing, based on the first configuration information and the second configuration information, the CLI measurement for the at least one measurement object within the at least one DLBWP; and step S403, transmitting a measurement report to the network device, wherein the measurement report includes measurement results corresponding to all or some of the at least one DLBWP.

In some implementations, the at least one DLBWP includes at least one inactive BWP.

In some implementations, only one active BWP is included in the same service cell, and thus the at least one DLBWP includes at least one inactive DLBWP.

In an implementation, receiving the first configuration information and the second configuration information from the network device includes receiving RRC signaling, and the RRC signaling includes the first configuration information and the second configuration information.

In an implementation, the first configuration information and the second configuration information are of the same configuration information or different configuration information.

In some implementations, a switching indication is also received from the network device. The switching indication indicates a target DLBWP to be switched to, and the target DLBWP is a DLBWP determined by the network device based on the measurement report.

In some implementations, after receiving the switching indication from the network device, the user device switches to the target DLBWP indicated by the switching indication.

In some embodiments, each DLBWP corresponding to the measurement result included in the measurement report has an interference value greater than or equal to a corresponding measurement threshold, so that the network device determines the DLBWP with the lesser interference value by using an exclusion method. In an example, the network device receives the measurement report, and selects, as the target DLBWP, any DLBWP of the at least one DLBWP other than a DLBWP included in the measurement report.

In some embodiments, each DLBWP corresponding to the measurement result included in the measurement report has an interference value less than or equal to a corresponding measurement threshold, so that the network device directly determines the DLBWP with the lesser interference value based on the measurement report. In an example, the network device receives the measurement report and selects, from the DLBWPs included in the measurement report, the DLBWP corresponding to the measurement result with the smallest interference value as the target DLBWP.

In the embodiment of the present disclosure, the deficiency that the user device can only perform the CLI measurement on one active BWP in the same service cell is overcome by performing a measurement on at least one DLBWP including an inactive DLBWP in the same service cell, thereby obtaining more accurate measurement results. Moreover, the measurement report reported by the user device corresponds only to the DLBWP that meets the set measurement threshold, thereby saving network communication resources.

Figure 5:
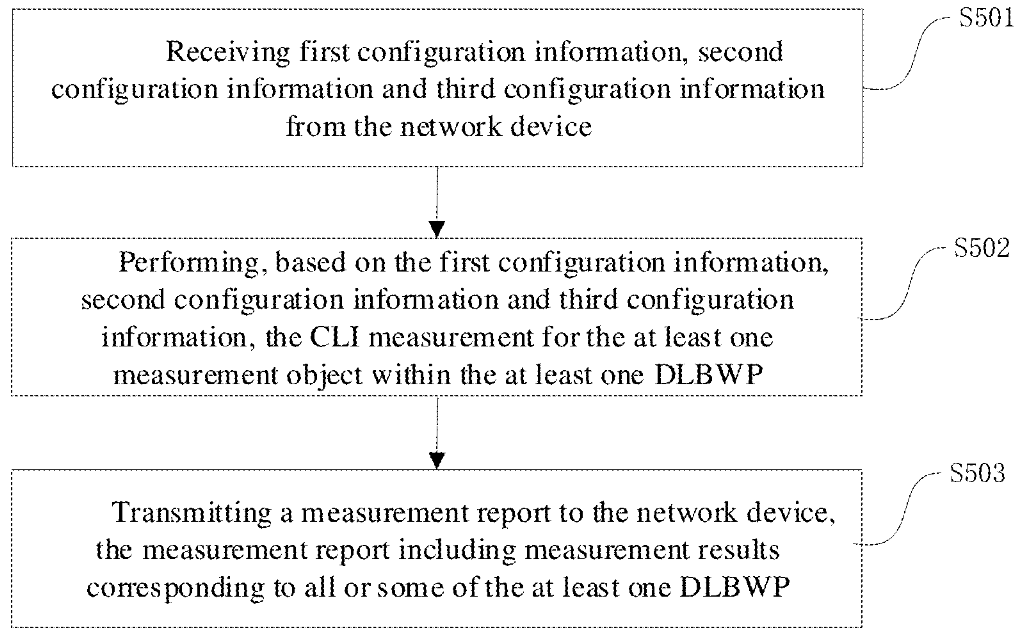
FIG. 5 is a flowchart of another measurement method according to an embodiment.

An embodiment of the present disclosure provides a measurement method, which is performed by a user device. FIG. 5 is a flowchart of a measurement method according to an embodiment. As shown in FIG. 5, the measurement method includes:

- step S501, receiving first configuration information, second configuration information and third configuration information from the network device, wherein the first configuration information indicates to perform a cross-link interference (CLI) measurement for at least one measurement object within at least one downlink bandwidth part (DLBWP), the at least one measurement object includes at least one of SRS-RSRP or CLI-RSSI, the second configuration information indicates a measurement threshold corresponding to the measurement object in the first configuration information, and the third configuration information indicates a measurement interval corresponding to the measurement object in the first configuration information;
- step S502, performing, based on the first configuration information, the second configuration information and the third configuration information, the CLI measurement for the at least one measurement object within the at least one DLBWP; and
- step S503, transmitting a measurement report to the network device, wherein the measurement report includes measurement results corresponding to all or some of the at least one DLBWP.

In some implementations, the at least one DLBWP includes at least one inactive BWP.

In some implementations, only one active BWP is included in the same service cell, and thus the at least one DLBWP includes at least one inactive DLBWP.

In an implementation, receiving the first configuration information, the second configuration information and the third configuration information from the network device includes receiving RRC signaling, and the RRC signaling includes the first configuration information, the second configuration information and the third configuration information.

In an implementation, the first configuration information, the second configuration information and the third configuration information are of the same configuration information or different configuration information.

In an implementation, the user device performs the CLI measurement on the at least one measurement object within the at least one DLBWP at a time period corresponding to the corresponding measurement interval.

In some implementations, a switching indication is also received from the network device. The switching indication indicates a target DLBWP to be switched to, and the target DLBWP is a DLBWP determined by the network device based on the measurement report.

In some implementations, after receiving the switching indication from the network device, the user device switches to the target DLBWP indicated by the switching indication.

In some embodiments, each DLBWP corresponding to the measurement result included in the measurement report has an interference value greater than or equal to a corresponding measurement threshold, so that the network device determines the DLBWP with the lesser interference value by using an exclusion method. In an example, the network device receives the measurement report, and selects, as the target DLBWP, any DLBWP of the at least one DLBWP other than a DLBWP included in the measurement report.

In some embodiments, each DLBWP corresponding to the measurement result included in the measurement report has an interference value less than or equal to a corresponding measurement threshold, so that the network device directly determines the DLBWP with the lesser interference value based on the measurement report. In an example, the network device receives the measurement report and selects, from the DLBWPs included in the measurement report, the DLBWP corresponding to the measurement result with the smallest interference value as the target DLBWP.

In the embodiment of the present disclosure, the deficiency that the user device can only perform the CLI measurement on one active BWP in the same service cell is overcome by performing a measurement on at least one DLBWP including an inactive DLBWP in the same service cell, thereby obtaining more accurate measurement results. Moreover, the measurement report reported by the user device corresponds only to the DLBWP that meets the set measurement threshold, thereby saving network communication resources. Further, the user device performs the measurement within a measurement interval specified by the network device, thereby not affecting service continuity.

Figure 6:
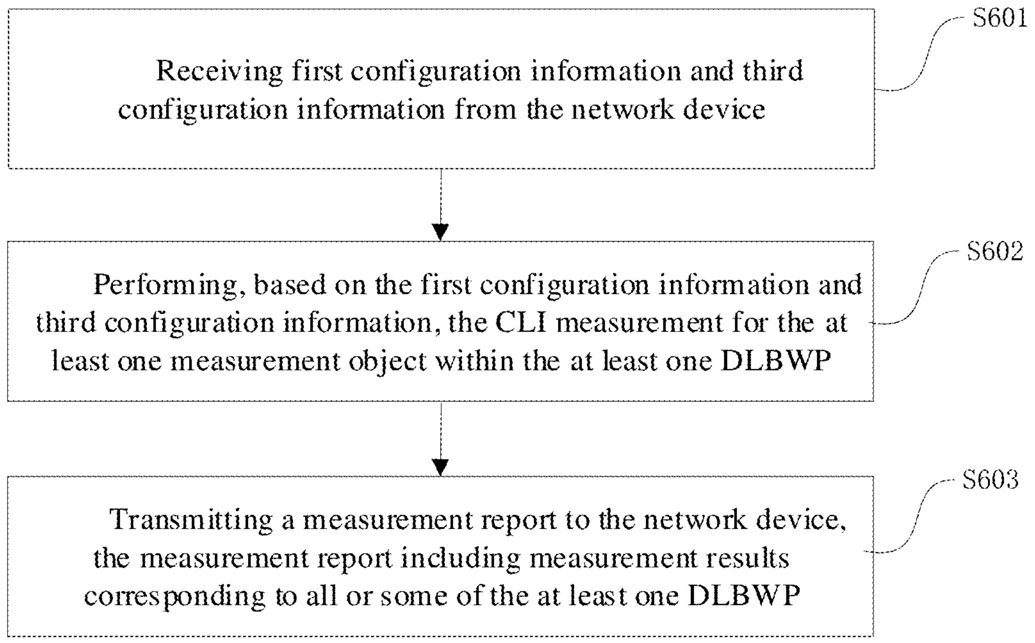
FIG. 6 is a flowchart of another measurement method according to an embodiment.

An embodiment of the present disclosure provides a measurement method, which is performed by a user device. FIG. 6 is a flowchart of a measurement method according to an embodiment. As shown in FIG. 6, the measurement method includes:

- step S601, receiving first configuration information and third configuration information from the network device, wherein the first configuration information indicates to perform a cross-link interference (CLI) measurement for at least one measurement object within at least one downlink bandwidth part (DLBWP), the at least one measurement object includes at least one of SRS-RSRP or CLI-RSSI, and the third configuration information indicates a measurement interval corresponding to the measurement object in the first configuration information;

step S602, performing, based on the first configuration information and the third configuration information, the CLI measurement for the at least one measurement object within the at least one DLBWP; and step S603, transmitting a measurement report to the network device, wherein the measurement report includes measurement results corresponding to all or some of the at least one DLBWP.

In some implementations, the at least one DLBWP includes at least one inactive BWP.

In some implementations, only one active BWP is included in the same service cell, and thus the at least one DLBWP includes at least one inactive DLBWP.

In an implementation, receiving the first configuration information and the third configuration information from the network device includes receiving RRC signaling, and the RRC signaling includes the first configuration information and the third configuration information.

In an implementation, the first configuration information and the third configuration information are of the same configuration information or different configuration information.

In an implementation, the user device performs the CLI measurement on the at least one measurement object within the at least one DLBWP at a time period corresponding to the corresponding measurement interval.

In some implementations, a switching indication is also received from the network device. The switching indication indicates a target DLBWP to be switched to, and the target DLBWP is a DLBWP determined by the network device based on the measurement report.

In some implementations, after receiving the switching indication from the network device, the user device switches to the target DLBWP indicated by the switching indication.

In the embodiment of the present disclosure, the deficiency that the user device can only perform the CLI measurement on one active BWP in the same service cell is overcome by performing a measurement on at least one DLBWP including an inactive DLBWP in the same service cell, thereby obtaining more accurate measurement results. Further, the user device performs the measurement within a measurement interval specified by the network device, thereby not affecting service continuity.

Figure 7:
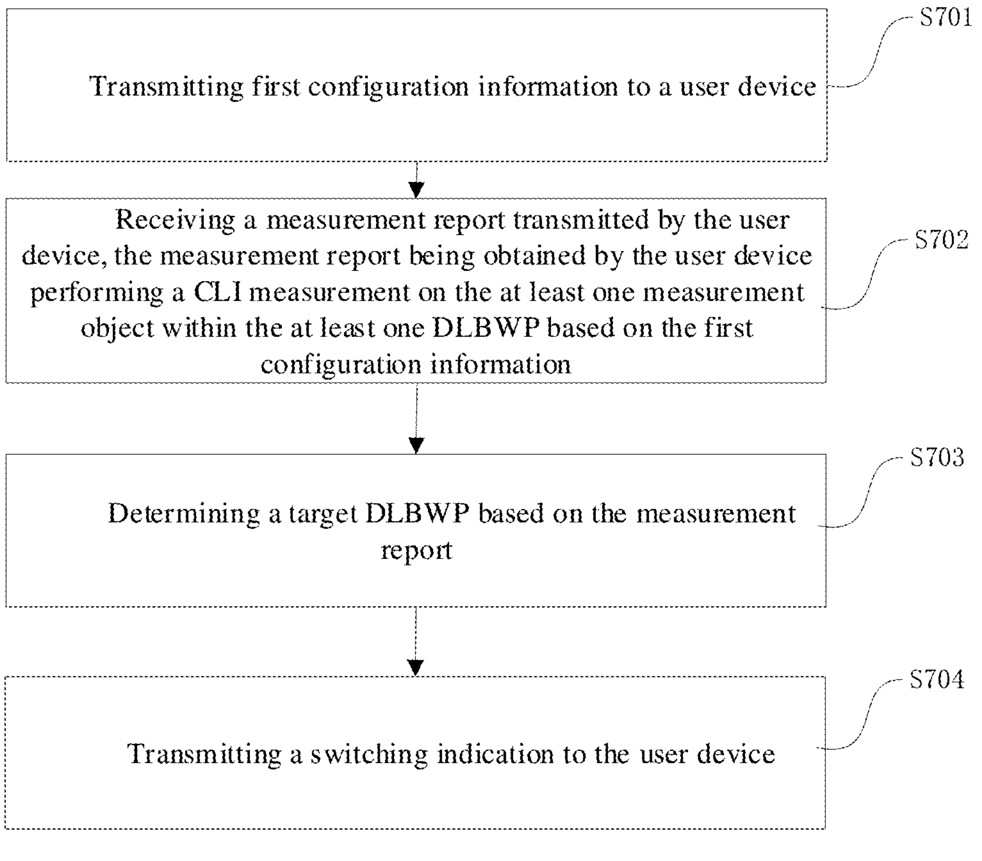
FIG. 7 is a flowchart of another measurement method according to an embodiment.

An embodiment of the present disclosure provides a measurement method, which is performed by a network device. FIG. 7 is a flowchart of a measurement method according to an embodiment. As shown in FIG. 7, the measurement method includes:

step S701, transmitting first configuration information to a user device, wherein the first configuration information indicates to perform a cross-link interference (CLI) measurement for at least one measurement object within at least one downlink bandwidth part (DLBWP), and the at least one measurement object includes at least one of SRS-RSRP or CLI-RSS1; and step S702, receiving a measurement report transmitted by the user device, wherein the measurement report includes measurement results corresponding to all or some of the at least one DLBWP.

In some implementations, the measurement report is obtained by the user device performing a CLI measurement on the at least one measurement object within the at least one DLBWP based on the first configuration information.

In an implementation, the measurement method further includes:

step S703, determining a target DLBWP based on the measurement report; and step S704, transmitting a switching indication to the user device, wherein the switching indication instructs the user device to switch to the target DLBWP.

In some implementations, the at least one DLBWP includes at least one inactive BWP.

In some implementations, only one active BWP is included in the same service cell, and thus the at least one DLBWP includes at least one inactive DLBWP.

In some implementations, transmitting the first configuration information to the user device includes transmitting RRC signaling, and the RRC signaling including the first configuration information.

In some implementations, the measurement report includes a measurement result for each of the at least one DLBWP.

In the embodiment of the present disclosure, the deficiency that the user device can only perform the CLI measurement on one active BWP in the same service cell is overcome by performing a measurement on at least one DLBWP including an inactive DLBWP in the same service cell, so that the network device may obtain more accurate measurement results.

Figure 8:
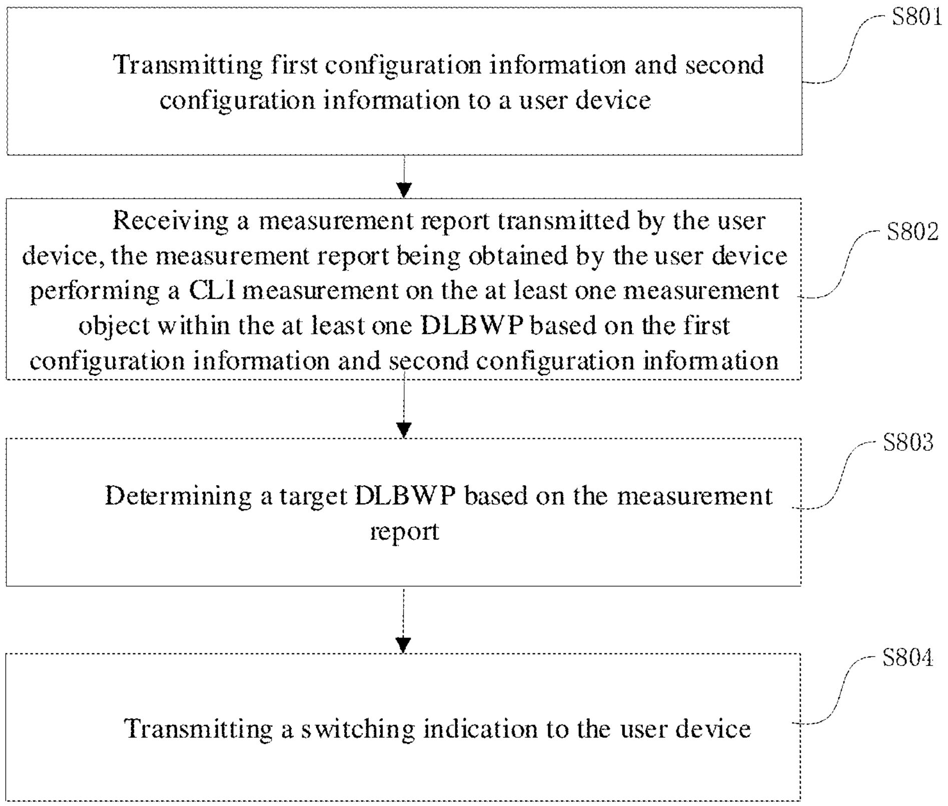
FIG. 8 is a flowchart of another measurement method according to an embodiment.

An embodiment of the present disclosure provides a measurement method, which is performed by a network device. FIG. 8 is a flowchart of a measurement method according to an embodiment. As shown in FIG. 8, the measurement method includes:

step S801, transmitting first configuration information and second configuration information to a user device, wherein the first configuration information indicates to perform a cross-link interference (CLI) measurement for at least one measurement object within at least one downlink bandwidth part (DLBWP) including an inactive DLBWP, the at least one measurement object includes at least one of SRS-RSRP or CLI-RSSI, and the second configuration information indicates a measurement threshold corresponding to the measurement object in the first configuration information;

step S802, receiving a measurement report transmitted by the user device, wherein the measurement report includes measurement results corresponding to all or some of the at least one DLBWP.

In some implementations, the measurement report is obtained by the user device performing a CLI measurement on the at least one measurement object within the at least one DLBWP based on the first configuration information and the second configuration information.

In some implementations, the first configuration information and the second configuration information are of the same configuration information or different configuration information.

In an implementation, the measurement method further includes:

step S803, determining a target DLBWP based on the measurement report; and step S804, transmitting a switching indication to the user device, wherein the switching indication instructs the user device to switch to the target DLBWP.

In some implementations, the at least one DLBWP includes at least one inactive BWP.

In some implementations, only one active BWP is included in the same service cell, and thus the at least one DLBWP includes at least one inactive DLBWP.

In an implementation, transmitting the first configuration information and the second configuration information to the user device includes transmitting RRC signaling, and the RRC signaling includes the first configuration information and the second configuration information.

In some implementations, each DLBWP corresponding to the measurement result included in the measurement report has an interference value greater than or equal to a corresponding measurement threshold, so that the network device determines the DLBWP with the lesser interference value by using an exclusion method. Specifically, determining the target DLBWP based on the measurement report includes: determining the target DLBWP to be any one of the at least one DLBWP other than a DLBWP included in the measurement report.

In some embodiments, each DLBWP corresponding to the measurement result included in the measurement report has an interference value less than or equal to a corresponding measurement threshold, so that the network device directly determines the DLBWP with the lesser interference value based on the measurement report. Specifically, determining the target DLBWP based on the measurement report includes: determining the target DLBWP to be any one of DLBWPs included in the measurement report.

For example, the target DLBWP is determined to be a DLBWP, with the smallest interference value, of the DLBWPs included in the measurement report.

In the embodiment of the present disclosure, the deficiency that the user device can only perform the CLI measurement on one active BWP in the same service cell is overcome by performing a measurement on at least one DLBWP including an inactive DLBWP in the same service cell, thereby obtaining more accurate measurement results. Moreover, the measurement report reported by the UE corresponds only to the DLBWP that meets the set measurement threshold, thereby saving network communication resources.

Figure 9:
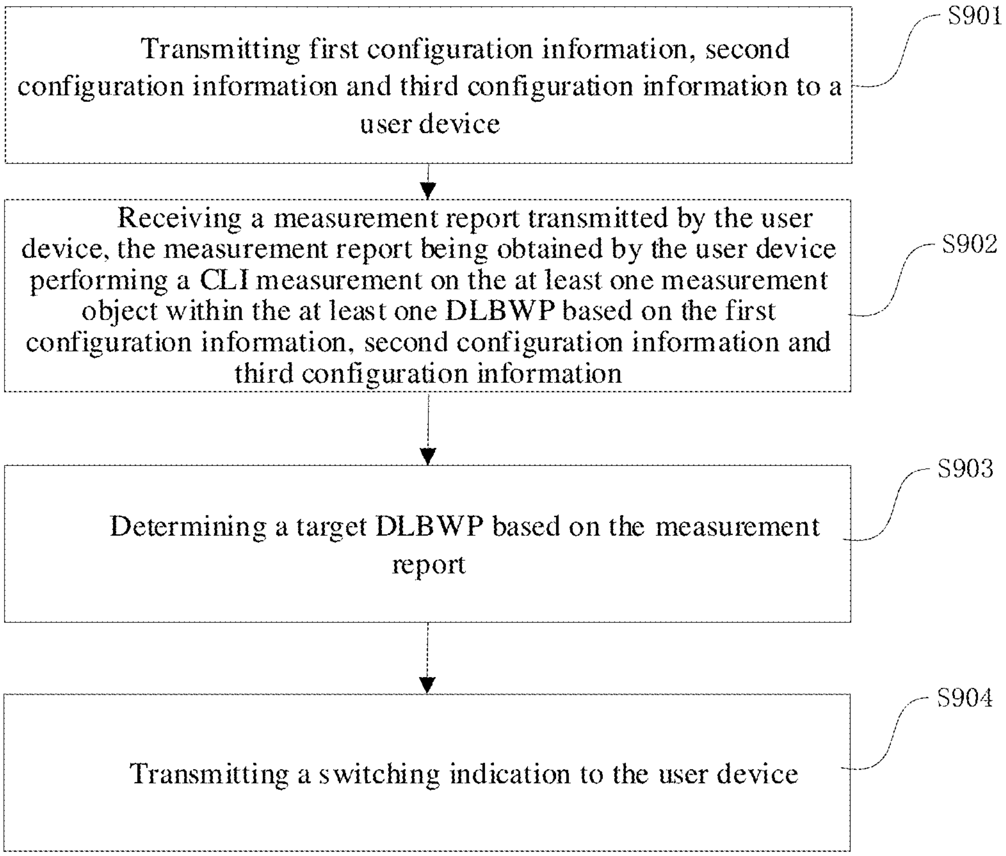
FIG. 9 is a flowchart of another measurement method according to an embodiment.

An embodiment of the present disclosure provides a measurement method, which is performed by a network device. FIG. 9 is a flowchart of a measurement method according to an embodiment. As shown in FIG. 9, the measurement method includes:

step S901, transmitting first configuration information, second configuration information and third configuration information to a user device, wherein the first configuration information indicates to perform a cross-link interference (CLI) measurement for at least one measurement object within at least one downlink bandwidth part (DLBWP) including an inactive DLBWP, the at least one measurement object includes at least one of SRS-RSRP or CLI-RSSI, the second configuration information indicates a measurement threshold corresponding to the measurement object in the first configuration information, and the third configuration information indicates a measurement interval (gap) corresponding to the measurement object in the first configuration information;

step S902, receiving a measurement report transmitted by the user device, wherein the measurement report includes measurement results corresponding to all or some of the at least one DLBWP.

In some implementations, the measurement report is obtained by the user device performing a CLI measurement on the at least one measurement object within the at least one DLBWP based on the first configuration information, the second configuration information and the third configuration information.

In some implementations, the first configuration information, the second configuration information and the third configuration information are of the same configuration information or different configuration information.

In an implementation, the measurement method further includes:

step S903, determining a target DLBWP based on the measurement report; and step S904, transmitting a switching indication to the user device, wherein the switching indication instructs the user device to switch to the target DLBWP.

In some implementations, the at least one DLBWP includes at least one inactive BWP.

In some implementations, only one active BWP is included in the same service cell, and thus the at least one DLBWP includes at least one inactive DLBWP.

In an implementation, transmitting the first configuration information, the second configuration information and the third configuration information to the user device includes transmitting RRC signaling, and the RRC signaling includes the first configuration information, the second configuration information and the third information.

In an implementation, the measurement interval (gap) in the third configuration information makes the user device to perform the CLI measurement on the at least one measurement object within the at least one DLBWP at a time period corresponding to the corresponding measurement interval.

In some implementations, each DLBWP corresponding to the measurement result included in the measurement report has an interference value greater than or equal to a corresponding measurement threshold, so that the network device determines the DLBWP with the lesser interference value by using an exclusion method. Specifically, determining the target DLBWP based on the measurement report includes: determining the target DLBWP to be any one of the at least one DLBWP other than a DLBWP included in the measurement report.

In some embodiments, each DLBWP corresponding to the measurement result included in the measurement report has an interference value less than or equal to a corresponding measurement threshold, so that the network device directly determines the DLBWP with the lesser interference value based on the measurement report. Specifically, determining the target DLBWP based on the measurement report includes: determining the target DLBWP to be any one of DLBWPs included in the measurement report.

For example, the target DLBWP is determined to be a DLBWP, with the smallest interference value, of the DLBWPs included in the measurement report.

In the embodiment of the present disclosure, the deficiency that the user device can only perform the CLI measurement on one active BWP in the same service cell is overcome by performing a measurement on at least one DLBWP including an inactive DLBWP in the same service cell, thereby obtaining more accurate measurement results. Moreover, the measurement report reported by the UE corresponds only to the DLBWP that meets the set measurement threshold, thereby saving network communication resources. Further, the UE performs the measurement within a measurement interval specified by the network device, thereby not affecting service continuity.

Figure 10:
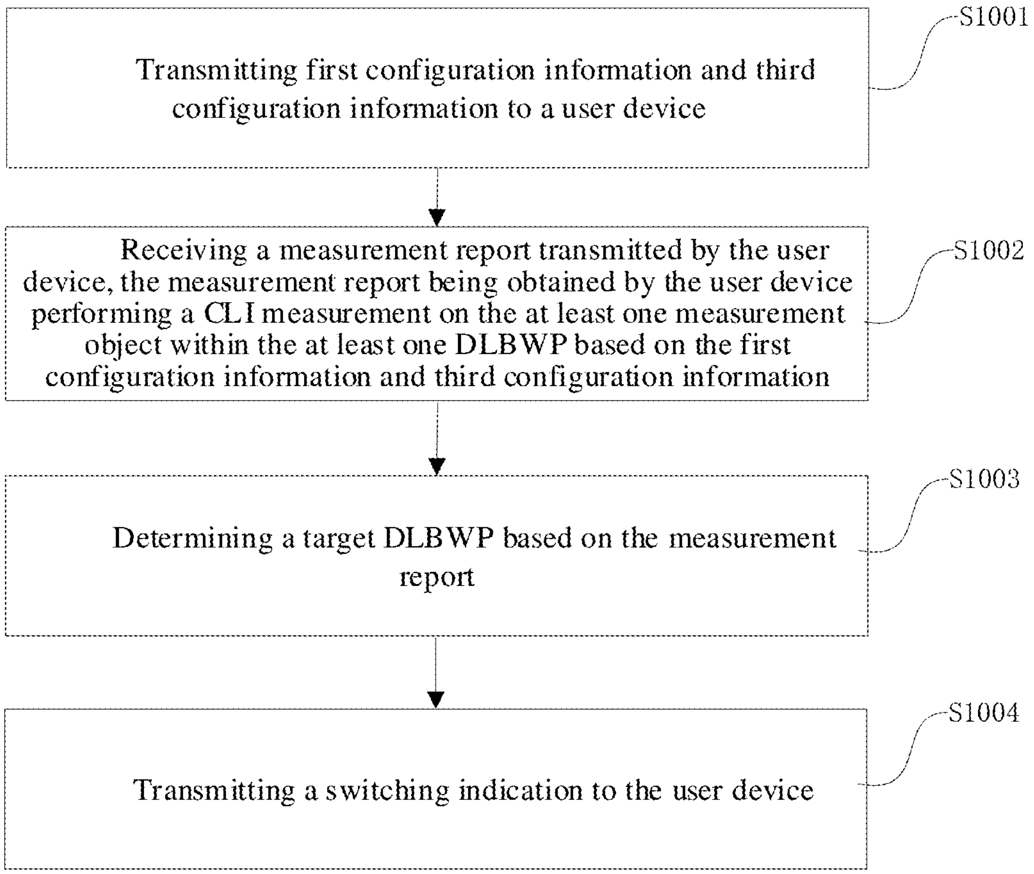
FIG. 10 is a flowchart of another measurement method according to an embodiment.

An embodiment of the present disclosure provides a measurement method, which is performed by a network device. FIG. 10 is a flowchart of a measurement method according to an embodiment. As shown in FIG. 10, the measurement method includes:

step S1001, transmitting first configuration information and third configuration information to a user device, wherein the first configuration information indicates to perform a cross-link interference (CLI) measurement for at least one measurement object within at least one downlink bandwidth part (DLBWP) including an inactive DLBWP, the at least one measurement object includes at least one of SRS-RSRP or CLI-RSSI, and the third configuration information indicates a measurement interval (gap) corresponding to the measurement object in the first configuration information;

step S1002, receiving a measurement report transmitted by the user device, wherein the measurement report includes measurement results corresponding to all or some of the at least one DLBWP, and the measurement report is obtained by the user device performing a CLI measurement on the at least one measurement object within the at least one DLBWP based on the first configuration information and third configuration information.

In some implementations, the first configuration information and the third configuration information are of the same configuration information or different configuration information.

In an implementation, the measurement method further includes:

step S1003, determining a target DLBWP based on the measurement report; and step S1004, transmitting a switching indication to the user device, wherein the switching indication instructs the user device to switch to the target DLBWP.

In some implementations, the at least one DLBWP includes at least one inactive BWP.

In some implementations, only one active BWP is included in the same service cell, and thus the at least one DLBWP includes at least one inactive DLBWP.

In an implementation, transmitting the first configuration information and the third configuration information to the user device includes transmitting RRC signaling, and the RRC signaling includes the first configuration information and the third information.

In an implementation, the measurement interval (gap) in the third configuration information makes the user device to perform the CLI measurement on the at least one measurement object within the at least one DLBWP at a time period corresponding to the corresponding measurement interval.

In the embodiment of the present disclosure, the deficiency that the user device can only perform the CLI measurement on one active BWP in the same service cell is overcome by performing a measurement on at least one DLBWP including an inactive DLBWP in the same service cell, thereby obtaining more accurate measurement results. Further, the UE performs the measurement within a measurement interval specified by the network device, thereby not affecting service continuity.

Based on the same conception as the above method embodiment, an embodiment of the present disclosure also provides a communication device that may have a function of the user device 101 in the above method embodiment and may be used to perform steps provided by the above method embodiment that are performed by the user device 101. The function may be implemented by hardware, or may be implemented by software or by the hardware executing corresponding software. The hardware or software includes one or more modules corresponding to the function described above.

Figure 11:
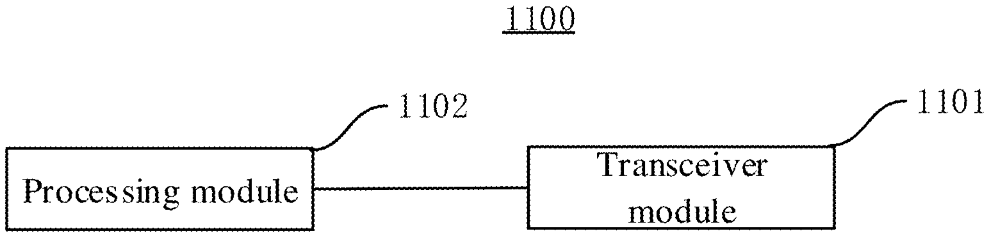
FIG. 11 is a structural diagram of a measurement device according to an embodiment.

In an implementation, the communication device 1100 as shown in FIG. 11 may act as the user device involved in the above method embodiment and perform the steps performed by the user device in the above method embodiment. As shown in FIG. 11, the communication device 1100 may include a transceiver module 1101 and a processing module 1102, and the transceiver module 1101 and the processing module 1102 are coupled to each other. The transceiver module 1101 may be used to support the communication of the communication device 1100. The transceiver module 1101 may have a wireless communication function, for example, can communicate wirelessly with other communication devices via a wireless air interface. The processing module 1102 may be used to support the communication device 1100 to perform the processing actions in the method embodiment described above, including but not limited to: generating information and message transmitted by the transceiver module 1101, and/or demodulating and decoding signal received by the transceiver module 1101, and the like.

In performing the step implemented by the user device 101, the transceiver module 1101 is configured to receive first configuration information from a network device.

The first configuration information indicates to perform a cross-link interference (CLI) measurement for at least one measurement object within at least one downlink bandwidth part (DLBWP), and the at least one measurement object includes at least one of SRS-RSRP or CLI-RSSI.

The processing module 1102 is configured to perform, based on the first configuration information, the CLI measurement for the at least one measurement object within the at least one DLBWP.

The transceiver module 1101 is further configured to transmit a measurement report to the network device, and the measurement report includes measurement results corresponding to all or some of the at least one DLBWP.

In some implementations, the transceiver module 1101 is further configured to receive second configuration information from the network device, the second configuration information indicates a measurement threshold corresponding to the measurement object in the first configuration information, and the first configuration information and the second configuration information are of the same configuration information or different configuration information.

In some implementations, the transceiver module 1101 is further configured to receive third configuration information from the network device, the third configuration information indicates a measurement interval corresponding to the measurement object in the first configuration information, the processing module 1102 is further configured to perform, based on the first configuration information, the second configuration information and the third configuration information, the CLI measurement for the at least one measurement object within the at least one DLBWP, and the first configuration information, the second configuration information and the third configuration information are of same configuration information or different configuration information.

In some implementations, the transceiver module 1101 is further configured to receive third configuration information from the network device, the third configuration information indicates a measurement interval corresponding to the measurement object in the first configuration information, the processing module 1102 is further configured to perform, based on the first configuration information and the third configuration information, the CLI measurement for the at least one measurement object within the at least one DLBWP, and the first configuration information and the third configuration information are of same configuration information or different configuration information.

In some implementations, an interference value of each DLBWP corresponding to the measurement result included in the measurement report is greater than or equal to a corresponding measurement threshold.

In some implementations, an interference value of each DLBWP corresponding to the measurement result included in the measurement report is less than or equal to a corresponding measurement threshold.

In some implementations, the transceiver module 1101 is further configured to receive a switching indication from the network device, the switching indication indicates a target DLBWP to be switched to, and the target DLBWP is a DLBWP determined by the network device based on the measurement report.

Figure 12:
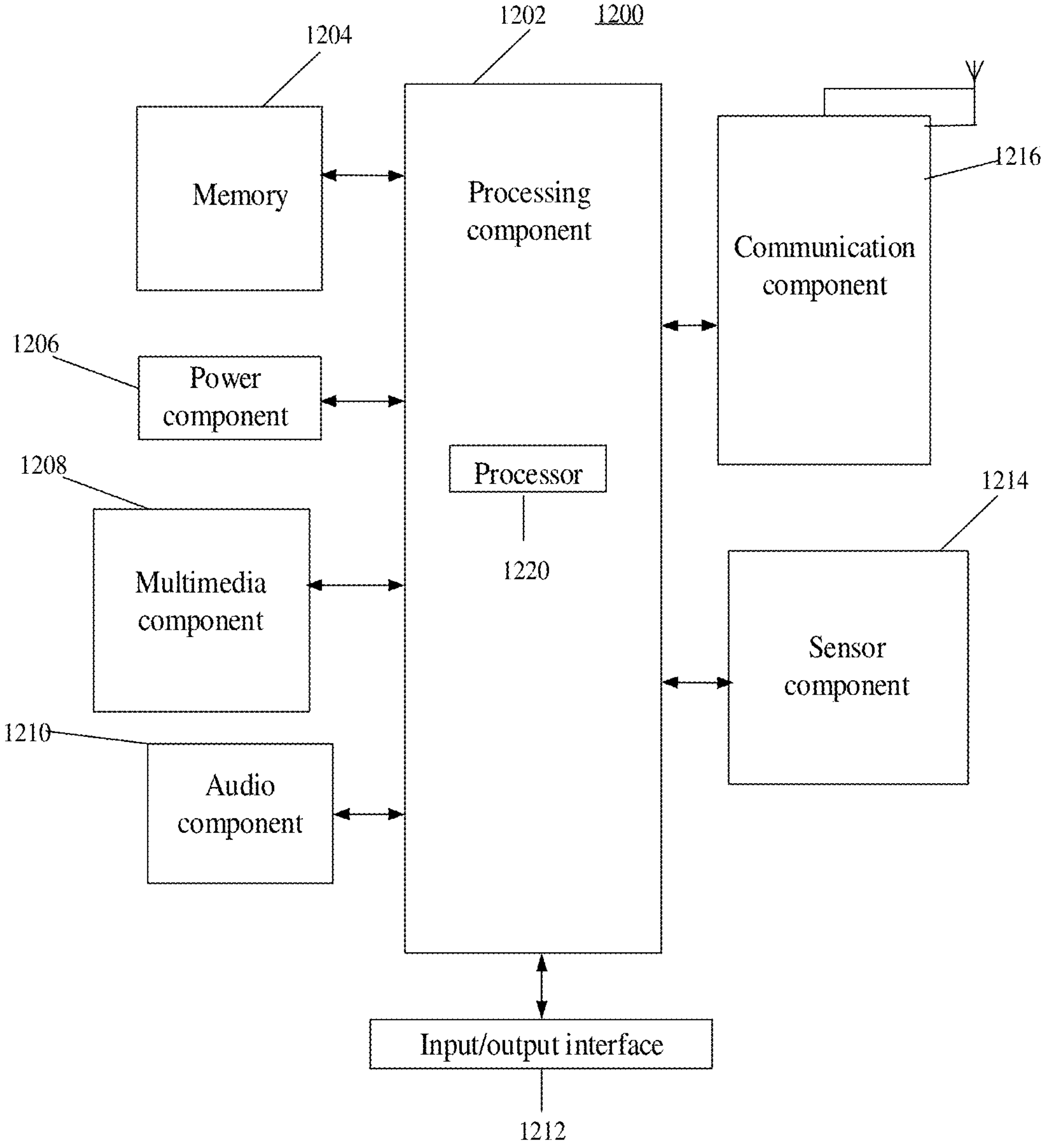
FIG. 12 is a structural diagram of another measurement device according to an embodiment.

When the communication device is a user device 102, the structure thereof may be as shown in FIG. 12. Referring to FIG. 12, the device 1200 may include one or more of a processing component 1202, a memory 1204, a power component 1206, a multimedia component 1208, an audio component 1210, an input/output (I/O) interface 1212, a sensor component 1214, and a communication component 1216.

The processing component 1202 generally controls the overall operations of the device 1200, such as operations associated with display, telephone calls, data communications, camera operations, and recording operations. The processing component 1202 may include one or more processors 1220 to execute instructions to complete all or part of the steps of the foregoing method. In addition, the processing component 1202 may include one or more modules to facilitate interaction between the processing component 1202 and other components. For example, the processing component 1202 may include a multimedia module to facilitate the interaction between the multimedia component 1208 and the processing component 1202.

The memory 1204 is configured to store various types of data to support the operation at the device 1200. Examples of these data include instructions for any application or method operating on the device 1200, contact data, phone book data, messages, pictures, videos and the like. The memory 1204 may be implemented by any type of volatile or non-volatile storage device or a combination thereof, such as static random access memory (SRAM), electrically erasable programmable read-only memory (EEPROM), erasable and programmable read-only memory (EPROM), programmable read-only memory (PROM), read-only memory (ROM), magnetic memory, flash memory, magnetic disk or optical disk.

The power component 1206 provides power to various components of the device 1200. The power component 1206 may include a power management system, one or more power supplies, and other components associated with generating, managing, and distributing power for the device 1200.

The multimedia component 1208 includes a screen that provides an output interface between the device 1200 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor may not only sense the boundary of the touch or slide action, but also detect the duration and pressure related to the touch or slide operation. In some embodiments, the multimedia component 1208 includes a front camera and/or a rear camera. When the device 1200 is in an operation mode, such as a shooting mode or a video mode, the front camera and/or the rear camera can receive external multimedia data. Each of the front camera and rear camera may be a fixed optical lens system or have focal length and optical zoom capabilities.

The audio component 1210 is configured to output and/or input audio signals. For example, the audio component 1210 includes a microphone (MIC), and when the device 1200 is in an operation mode, such as a call mode, a recording mode, and a voice recognition mode, the microphone is configured to receive an external audio signal. The received audio signal can be further stored in the memory 1204 or sent via the communication component 1216. In some embodiments, the audio component 1210 further includes a speaker for outputting audio signals.

The I/O interface 1212 provides an interface between the processing component 1202 and a peripheral interface module. The above-mentioned peripheral interface module may be a keyboard, a click wheel, a button, and the like. These buttons may include but are not limited to home button, volume button, start button, and lock button.

The sensor component 1214 includes one or more sensors for providing the device 1200 with various aspects of state evaluation. For example, the sensor component 1214 can detect the on/off status of the device 1200 and the relative positioning of components. For example, the component is a display and keypad of the device 1200. The sensor component 1214 can also detect the position change of the device 1200 or a component of the device 1200, the presence or absence of contact between the user and the device 1200, the orientation or acceleration/deceleration of the device 1200, and the temperature change of the device 1200. The sensor component 1214 may include a proximity sensor configured to detect the presence of nearby objects when there is no physical contact. The sensor component 1214 may also include a light sensor, such as a CMOS or CCD image sensor, for use in imaging applications. In some embodiments, the sensor component 1214 may also include an acceleration sensor, a gyroscope sensor, a magnetic sensor, a pressure sensor, or a temperature sensor.

The communication component 1216 is configured to facilitate wired or wireless communication between the device 1200 and other devices. The device 1200 can access a wireless network based on a communication standard, such as WiFi, 4G, or 5G, or a combination thereof. In an embodiment, the communication component 1216 receives a broadcast signal or broadcast related information from an external broadcast management system via a broadcast channel. In an embodiment, the communication component 1216 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an embodiment, the device 1200 may be implemented by one or more of application specific integrated circuit (ASIC), digital signal processor (DSP), digital signal processing device (DSPD), programmable logic devices (PLD), field programmable gate array (FPGA), controller, micro-controller, microprocessor, or other electronic components, to perform the above-mentioned methods.

An embodiment also provides a non-transitory computer-readable storage medium including instructions, such as the memory 1204 including instructions, and the instructions may be executed by the processor 1220 of the device 1200 to complete the foregoing method. For example, the non-transitory computer-readable storage medium may be ROM, random access memory (RAM), CD-ROM, magnetic tape, floppy disk, optical data storage device and the like.

Based on the same conception as the above method embodiment, an embodiment of the present disclosure also provides a communication device that may have a function of the network device 102 in the above method embodiment and may be used to perform steps provided by the above method embodiment that are performed by the network device 102. The function may be implemented by hardware, or may be implemented by software or by the hardware executing corresponding software. The hardware or software includes one or more modules corresponding to the function described above.

Figure 13:
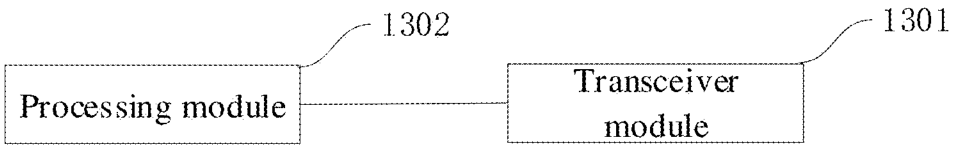
FIG. 13 is a structural diagram of another measurement device according to an embodiment.

In an implementation, the communication device 1300 as shown in FIG. 13 may act as the network device involved in the above method embodiment and perform the steps performed by the network device in the above method embodiment. As shown in FIG. 3, the communication device 1300 may include a transceiver module 1301 and a processing module 1302, and the transceiver module 1301 and the processing module 1302 are coupled to each other. The transceiver module 1301 may be used to support the communication of the communication device 300. The transceiver module 1301 may have a wireless communication function, for example, can communicate wirelessly with other communication devices via a wireless air interface. The processing module 1302 may be used to support the communication device 1300 to perform the processing actions in the method embodiment described above, including but not limited to: generating information and message transmitted by the transceiver module 1301, and/or demodulating and decoding signal received by the transceiver module 1301, and the like.

In performing the step implemented by the network device 102, the transceiver module 1301 is configured to transmit first configuration information to the user device.

The first configuration information indicates to perform a cross-link interference (CLI) measurement for at least one measurement object within at least one downlink bandwidth part (DLBWP), and the at least one measurement object includes at least one of SRS-RSRP or CLI-RSSI.

The transceiver module 1301 is further configured to receive a measurement report transmitted by the user device. The measurement report includes measurement results corresponding to all or some of the at least one DLBW, and the measurement report is obtained by the user device performing a CLI measurement on the at least one measurement object within the at least one DLBWP based on the first configuration information.

The processing module 1302 is configured to determine a target DLBWP based on the measurement report.

The transceiver module 1301 is further configured to transmit a switching indication to the user device, and the switching indication instructs the user device to switch to the target DLBWP.

In some implementations, the transceiver module 1301 is further configured to transmit second configuration information to the user device, the second configuration information indicates a measurement threshold corresponding to the measurement object in the first configuration information, and the first configuration information and the second configuration information are of same configuration information or different configuration information.

In some implementations, the transceiver module 1301 is further configured to transmit third configuration information to the user device, the third configuration information indicates a measurement interval corresponding to the measurement object in the first configuration information, the measurement report is obtained by the user device performing a CLI measurement on the at least one measurement object within the at least one DLBWP based on the first configuration information, the second configuration information and the third configuration information, and the first configuration information, the second configuration information and the third configuration information are of the same configuration information or different configuration information.

In some implementations, the transceiver module 1301 is further configured to transmit third configuration information to the user device, the third configuration information indicates a measurement interval corresponding to the measurement object in the first configuration information, the measurement report is obtained by the user device performing a CLI measurement on the at least one measurement object within the at least one DLBWP based on the first configuration information and the third configuration information, and the first configuration information and the third configuration information are of same configuration information or different configuration information.

In some implementations, the processing module 1302 is further configured to determine a target DLBWP based on the measurement report; and the transceiver module is further configured to transmit a switching indication to the user device, wherein the switching indication instructs the user device to switch to the target DLBWP.

In some implementations, the processing module 1302 is further configured to determine the target DLBWP to be any one of the at least one DLBWP other than a DLBWP included in the measurement report when an interference value of each DLBWP corresponding to the measurement result included in the measurement report is greater than or equal to a corresponding measurement threshold.

In some implementations, the processing module 1302 is further configured to determine the target DLBWP to be any one of DLBWPs included in the measurement report when an interference value of each DLBWP corresponding to the measurement result included in the measurement report is less than or equal to a corresponding measurement threshold.

Figure 14:
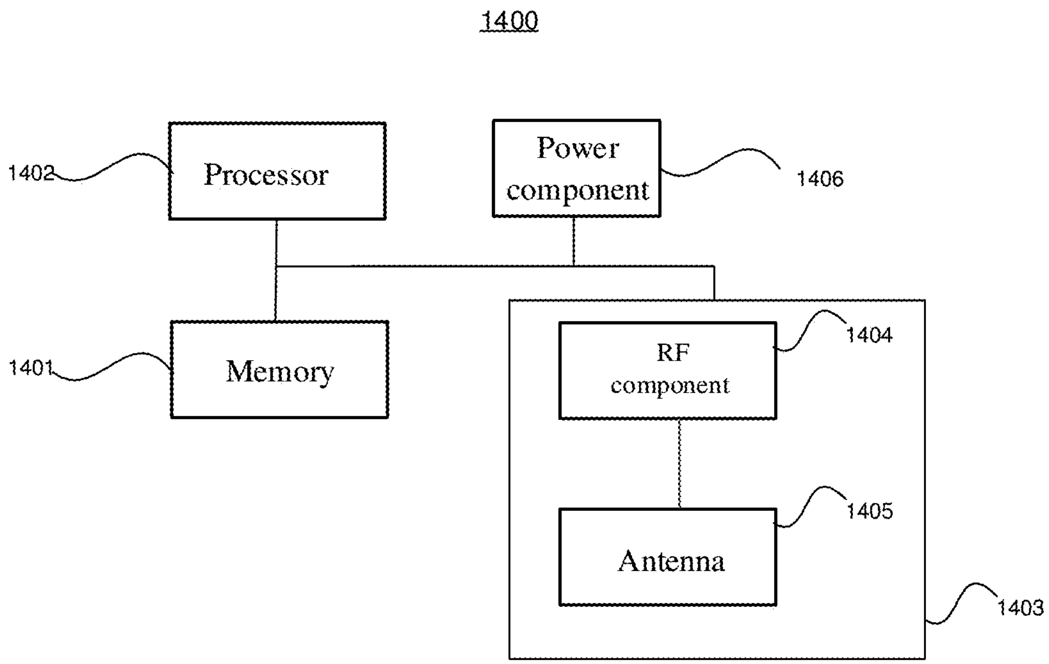
FIG. 14 is a structural diagram of another measurement device according to an embodiment.

When the communication device is a network device 102, the structure thereof may also be as shown in FIG. 14. The structure of the communication device is illustrated by taking a base station as an example. As shown in FIG. 14, the device 1400 includes a memory 1401, a processor 1402, a transceiver component 1403, and a power component 1406. The memory 1401 is coupled to the processor 1402 and may be used to store programs and data necessary for the communication device 1400 to implement various functions. The processor 1402 is configured to support the communication device 1400 to perform the corresponding function in the method described above, and the function may be realized by calling programs stored in the memory 1401. The transceiver component 1403 may be a wireless transceiver and may be used to support the communication device 1400 to receive and transmit signaling and/or data over a wireless air interface. The transceiver component 1403 may also be referred to as a transceiver unit or a communication unit, and the transceiver component 1403 may include an RF component 1404 and one or more antennas 1405. The RF component 1404 may be a remote radio unit (RRU), which may be used specifically for transmission of RF signals and conversion between RF signals and baseband signals. The one or more antennas 1405 may be specifically used to perform radiation and reception of RF signals.

When the communication device 1400 is to transmit data, the processor 1402 may output a baseband signal to a RF unit after baseband processing of the data to be transmitted, and the RF unit transmits the RF signal in the form of electromagnetic waves through the antenna after RF processing of the baseband signal. When there is data transmitted to the communication device 1400, the RF unit receives the RF signal through the antenna, converts the RF signal to the baseband signal, and outputs the baseband signal to the processor 1402, which converts the baseband signal to data and processes the data.

A person skilled in the art may easily conceive of other embodiments of the present disclosure upon consideration of the specification and practice of the invention disclosed herein. The present disclosure is intended to cover any variations, uses, or adaptations of the present disclosure that follow the general principles of the present disclosure and include the common general knowledge or conventional technical means in the technical field not disclosed by the present disclosure. The specification and embodiments are to be regarded as exemplary only, and the true scope and spirit of the embodiments of the present disclosure are indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

INDUSTRIAL UTILITY

The deficiency that the user device can only perform the CLI measurement on one active BWP in the same service cell is overcome by performing a measurement on at least one DLBWP including an inactive DLBWP in the same service cell, thereby obtaining more accurate measurement results.

What is claimed is:

1. A measurement method performed by a user device, comprising:

receiving first configuration information from a network device, wherein the first configuration information indicates to perform a cross-link interference (CLI) measurement for at least one measurement object within at least one downlink bandwidth part (DLBWP) comprising an inactive DLBWP, and the at least one measurement object comprises at least one of SRS-RSRP or CLI-RSSI;

performing, based on the first configuration information, the CLI measurement for the at least one measurement object within the at least one DLBWP; and transmitting a measurement report to the network device, wherein the measurement report comprises measurement results corresponding to all or some of the at least one DLBWP, wherein an interference value of each DLBWP corresponding to a measurement result comprised in the measurement report is greater than or equal to a corresponding measurement threshold.

2. The measurement method according to claim 1, further comprising:

receiving second configuration information from the network device, wherein the second configuration information indicates a measurement threshold corresponding to the measurement object in the first configuration information, wherein performing, based on the first configuration information, the CLI measurement for the at least one measurement object within the at least one DLBWP comprises:

performing, based on the first configuration information and the second configuration information, the CLI measurement for the at least one measurement object within the at least one DLBWP, wherein the first configuration information and the second configuration information are of same configuration information or different configuration information.

3. The measurement method according to claim 2, further comprising:

receiving third configuration information from the network device, wherein the third configuration information indicates a measurement interval corresponding to the measurement object in the first configuration information, wherein performing, based on the first configuration information, the CLI measurement for the at least one measurement object within the at least one DLBWP comprises:

performing, based on the first configuration information, the second configuration information and the third configuration information, the CLI measurement for the at least one measurement object within the at least one DLBWP, wherein the first configuration information, the second configuration information and the third configuration information are of same configuration information or different configuration information.

4. The measurement method according to claim 1, further comprising:

receiving third configuration information from the network device, wherein the third configuration information indicates a measurement interval corresponding to the measurement object in the first configuration information, wherein performing, based on the first configuration information, the CLI measurement for the at least one measurement object within the at least one DLBWP comprises:

performing, based on the first configuration information and the third configuration information, the CLI measurement for the at least one measurement object within the at least one DLBWP, wherein the first configuration information and the third configuration information are of same configuration information or different configuration information.

5. The measurement method according to claim 1, further comprising:

receiving a switching indication from the network device, wherein the switching indication indicates a target DLBWP to be switched to, and the target DLBWP is a DLBWP determined by the network device based on the measurement report.

6. A measurement method performed by a network device, comprising:

transmitting first configuration information to a user device, wherein the first configuration information indicates to perform a cross-link interference (CLI) measurement for at least one measurement object within at least one downlink bandwidth part (DLB WP) comprising an inactive DLBWP, and the at least one measurement object comprises at least one of SRS-RSRP or CLI-RSSI; and receiving a measurement report transmitted by the user device, wherein the measurement report comprises measurement results corresponding to all or some of the at least one DLBWP, wherein the measurement report is obtained by the user device performing, based on the first configuration information, the CLI measurement for the at least one measurement object within the at least one DLBWP, wherein an interference value of each DLBWP corresponding to a measurement result comprised in the measurement report is greater than or equal to a corresponding measurement threshold.

7. The measurement method according to claim 6, further comprising:

transmitting second configuration information to the user device, wherein the second configuration information indicates a measurement threshold corresponding to the measurement object in the first configuration information, wherein the first configuration information and the second configuration information are of same configuration information or different configuration information.

8. The measurement method according to claim 7, further comprising:

transmitting third configuration information to the user device, wherein the third configuration information indicates a measurement interval corresponding to the measurement object in the first configuration information, wherein the first configuration information, the second configuration information and the third configuration information are of the same configuration information or different configuration information.

9. The measurement method according to claim 6, further comprising:

transmitting third configuration information to the user device, wherein the third configuration information indicates a measurement interval corresponding to the measurement object in the first configuration information, wherein the first configuration information and the third configuration information are of same configuration information or different configuration information.

10. The measurement method according to claim 6, further comprising:

determining a target DLBWP based on the measurement report; and transmitting a switching indication to the user device, wherein the switching indication instructs the user device to switch to the target DLBWP.

11. The measurement method according to claim 10, wherein an interference value of each DLBWP corresponding to the measurement result comprised in the measurement report is greater than or equal to a corresponding measurement threshold, and determining the target DLBWP based on the measurement report comprises:

determining the target DLBWP to be any one of the at least one DLBWP other than a DLBWP comprised in the measurement report.

12. A measurement device applied in a user device, comprising:

a processor; and a memory storing a computer program;

wherein the processor is configured to:

receive first configuration information from a network device, wherein the first configuration information indicates to perform a cross-link interference (CLI) measurement for at least one measurement object within at least one downlink bandwidth part (DLBWP) comprising an inactive DLBWP, and the at least one measurement object comprises at least one of SRS-RSRP or CLI-RSSI;

perform, based on the first configuration information, the CLI measurement for the at least one measurement object within the at least one DLBWP; and transmit a measurement report to the network device, wherein the measurement report comprises measurement results corresponding to all or some of the at least one DLBWP, wherein an interference value of each DLBWP corresponding to a measurement result comprised in the measurement report is greater than or equal to a corresponding measurement threshold.

13. The measurement device according to claim 12, wherein the processor is further configured to:

receive second configuration information from the network device, wherein the second configuration information indicates a measurement threshold corresponding to the measurement object in the first configuration information, wherein performing, based on the first configuration information, the CLI measurement for the at least one measurement object within the at least one DLBWP comprises:

performing, based on the first configuration information and the second configuration information, the CLI measurement for the at least one measurement object within the at least one DLBWP, wherein the first configuration information and the second configuration information are of same configuration information or different configuration information.

14. The measurement device according to claim 13, wherein the processor is further configured to:

receive third configuration information from the network device, wherein the third configuration information indicates a measurement interval corresponding to the measurement object in the first configuration information, wherein performing, based on the first configuration information, the CLI measurement for the at least one measurement object within the at least one DLBWP comprises:

performing, based on the first configuration information, the second configuration information and the third configuration information, the CLI measurement for the at least one measurement object within the at least one DLBWP, wherein the first configuration information, the second configuration information and the third configuration information are of same configuration information or different configuration information.

15. The measurement device according to claim 12, wherein the processor is further configured to:

receive third configuration information from the network device, wherein the third configuration information indicates a measurement interval corresponding to the measurement object in the first configuration information, wherein performing, based on the first configuration information, the CLI measurement for the at least one measurement object within the at least one DLBWP comprises:

performing, based on the first configuration information and the third configuration information, the CLI measurement for the at least one measurement object within the at least one DLBWP, wherein the first configuration information and the third configuration information are of same configuration information or different configuration information.

16. The measurement device according to claim 12, wherein the processor is further configured to:

receive a switching indication from the network device, wherein the switching indication indicates a target DLBWP to be switched to, and the target DLBWP is a DLBWP determined by the network device based on the measurement report.

* * * * *